(12) United States Patent
Deans

(10) Patent No.: US 7,186,033 B2
(45) Date of Patent: Mar. 6, 2007

(54) FIBER OPTIC BOOSTER CONNECTOR

(75) Inventor: Gregor Deans, Oxford (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 64 days.

(21) Appl. No.: 10/906,520

(22) Filed: Feb. 23, 2005

(65) Prior Publication Data

US 2006/0188202 A1    Aug. 24, 2006

(51) Int. Cl.
*G02B 6/36* (2006.01)
*H01S 3/00* (2006.01)
*H01R 33/945* (2006.01)

(52) U.S. Cl. .......................... 385/53; 385/101; 385/58; 385/88; 385/92; 385/139; 359/341.1; 359/333; 439/577

(58) Field of Classification Search .................. 385/88, 385/89, 92, 14, 139, 53, 58, 59, 100, 101; 359/341.1, 333; 439/577
See application file for complete search history.

(56) References Cited

U.S. PATENT DOCUMENTS

| 4,568,145 A | 2/1986 | Colin et al. |
| 5,642,219 A | 6/1997 | Ogiya et al. |
| 6,246,512 B1* | 6/2001 | Kakui .................... 359/337 |
| 6,334,020 B1* | 12/2001 | Fujimori et al. ............ 385/134 |
| 6,433,925 B1* | 8/2002 | Sakano et al. ......... 359/341.43 |
| 6,483,978 B1* | 11/2002 | Gao et al. .................... 385/135 |
| 6,995,899 B2* | 2/2006 | Aronstam .................... 359/333 |
| 2003/0174977 A1* | 9/2003 | Mayer et al. ................ 385/100 |
| 2004/0132337 A1 | 7/2004 | Plishner |

FOREIGN PATENT DOCUMENTS

| EP | 0356090 A2 | 8/1989 |
| EP | 0582406 B1 | 10/1993 |
| WO | WO99/49580 A2 | 9/1999 |
| WO | WO2004/003342 A2 | 1/2004 |

* cited by examiner

*Primary Examiner*—Brian M. Healy
(74) *Attorney, Agent, or Firm*—Trop, Pruner & Hu P.C.; Bryan P. Galloway; Jaime A. Castano

(57) ABSTRACT

An apparatus includes a housing, a first connection interface and an optical amplifier. The housing receives a fiber optic line and an electrical line. The first connection interface is located at least partially inside the housing and is exposed outside of the housing to couple the fiber optic line and the electrical line to a second connection interface. The optical amplifier is located inside the housing and is coupled to the fiber optic line. The optical amplifier receives power from the electrical line.

28 Claims, 5 Drawing Sheets

FIBER OPTIC BOOSTER CONNECTOR

BACKGROUND

The present invention generally relates to a fiber optic booster connector.

Fiber optic lines may be used in a subsea field for such purposes as communicating with or controlling and monitoring devices that are disposed on the seabed or in the well. More specifically, the fiber optic lines may be contained inside a cable or umbilical. The cable, in turn, may be formed from a series of concatenated cable segments that are optically and mechanically coupled together by connectors. Thus, for example, a particular fiber optic line of the cable may include a fiber optic line from each cable segment.

The range of the fiber optic line (and thus, the length of the fiber optic line) is limited by optical losses that are introduced by the fiber optic medium and connections (fiber optic line splices or connections made by cable connectors) of the fiber optic line. These optical losses attenuate the optical signal that is provided by the transmitter at the source end of the cable so that at the receiver end of the cable, the optical signal may have a significantly diminished amplitude. The optical signal that is received from a fiber optic line of the cable must have a minimum strength to satisfy signal-to-noise criteria. The optical losses increase with cable length and the number of connectors, and thus, these factors limit the range of the fiber optic line.

As a more specific example, FIG. 1 depicts the optical power 10 of an optical signal versus the distance from an optical transmitter. The optical signal propagates from the optical transmitter at one end of the fiber optic line to the other end of the fiber optic line. As shown at reference numeral 11, the optical power 10 has its peak near the transmitter. At a distance $D_4$ from the transmitter, the optical power 10 is at its minimum, as depicted at reference numeral 20. Thus, the optical power 10 generally declines with the distance from the transmitter. The general decline is attributable to fiber optic medium losses as well as connection losses that are introduced by connections in the fiber optic line.

More particularly, at reference numerals 12 and 16, the optical power 10 decreases relatively abruptly due to cable connectors that are located at distances $D_1$ and $D_3$, respectively, from the transmitter. As shown at reference numeral 14, the optical power 10 also decreases relatively abruptly due to a splice in the fiber optic line at a distance $D_2$ from the transmitter.

For many different type of applications, it is desirable to maximize the range of fiber optic communications. Therefore, there is a continuing need for an arrangement to extend the range of a fiber optic communication link.

SUMMARY

In an embodiment of the invention, an apparatus that is usable with a subsea power/communications infrastructure or well includes a housing, a first connection interface and an optical amplifier. The housing receives a fiber optic line and an electrical line. The first connection interface is located at least partially inside the housing and is exposed outside of the housing to couple the fiber optic line and the electrical line to a second connection interface. The optical amplifier is located inside the housing and is coupled to the fiber optic line. The optical amplifier receives power from the electrical line.

In another embodiment of the invention, a system that is usable with a subsea power/communications infrastructure or well includes cable segments and at least one connector to couple the cable segments together. Each cable includes fiber optic lines and electrical lines; and at least one of the connectors houses an optical amplifier that is powered by at least one of the electrical lines.

Advantages and other features of the invention will become apparent from the following description, drawing and claims.

DETAILED DESCRIPTION

Figure 2:
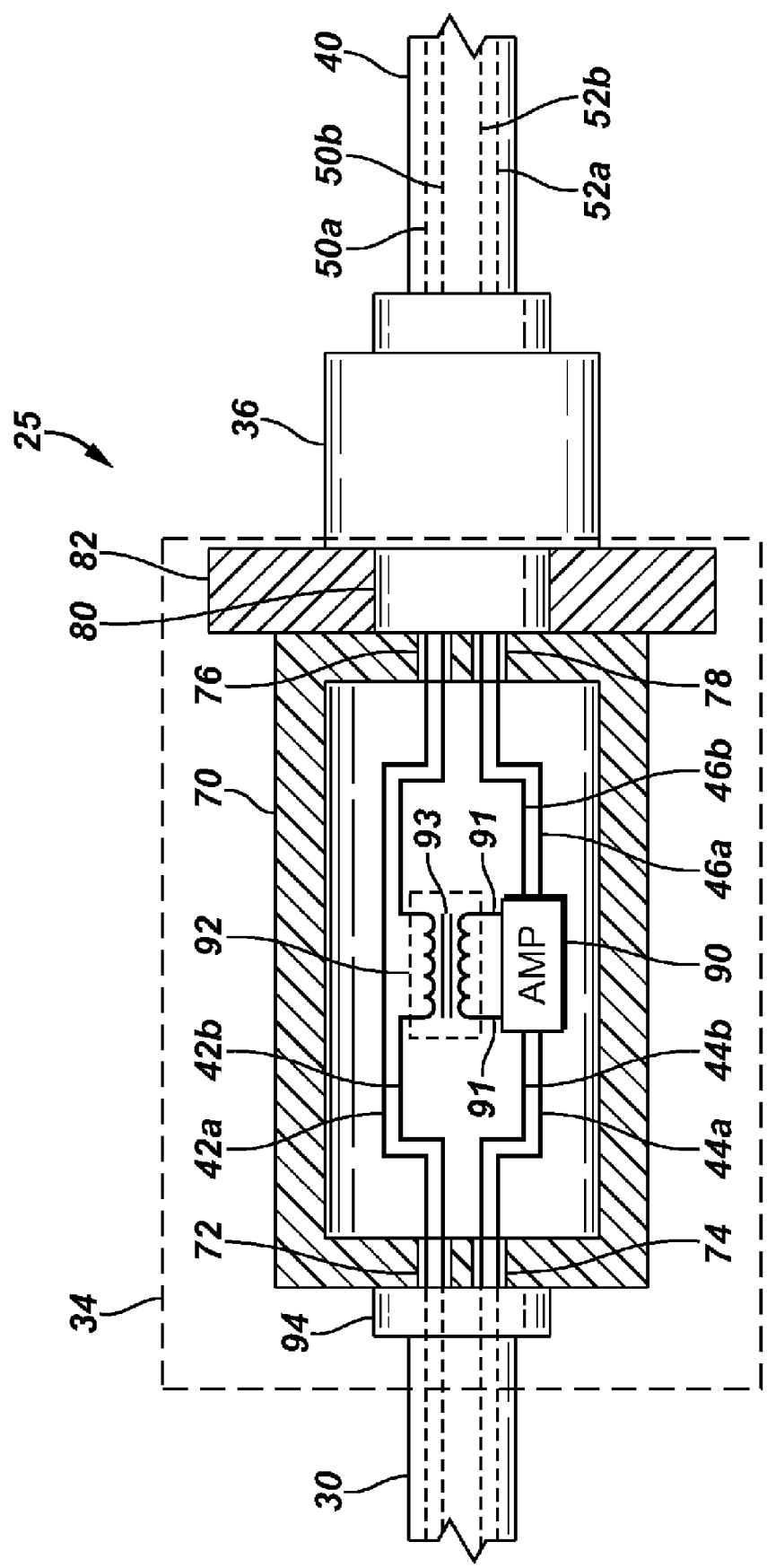
FIG. 2 is a schematic diagram of a fiber optic booster connector assembly according to an embodiment of the invention.

Referring to FIG. 2, in an embodiment 34 of the invention, a cable connector boosts the optical power in a fiber optic communication link to effectively extend the range of the link. The connector 34 (also called a "booster connector" herein) is part of a connector assembly 25 that couples electrical lines (electrical power lines, for example) and fiber optic lines of two cable segments 30 and 40 together. As a more specific example, FIG. 2 depicts exemplary electrical lines 42a and 42b of the cable segment 30. The connector assembly 25 couples the electrical lines 42a and 42b to corresponding exemplary electrical lines 50a and 50b, respectively, of the cable segment 40. FIG. 2 also depicts exemplary fiber optic lines 44a, 44b of the cable segment 30. The connector assembly 25 couples the fiber optic lines 44a and 44b to corresponding exemplary fiber optic lines 52a and 52b of the cable segment 40.

The connector 34 is attached to one end of the cable segment 30, and a mating connector 36 of the connector assembly 25 is attached to one end of the cable segment 40. The connector 34 is constructed to form a mating connection with the connector 36 to couple electrical and optical fiber lines of the cable segments 30 and 40 together. Depending on the particular embodiment of the invention, the connector 34 may be a female-type connector, a male-type connector, etc.; and the connector 36 is complimentary to the connector 34.

As depicted in FIG. 2, the connector 34 includes an optical amplifier 90 that boosts, or amplifies, the optical signals that are received from the fiber optic lines of the cable segment 30. For example, the optical amplifier 90 boosts, or amplifies, the optical signals that are provided by the fiber optic lines 44a and 44b to produce corresponding boosted, or amplified, optical signals on the fiber optic lines 52a and 52b, respectively. Due to this amplification of the optical signals, the optical amplifier 90 compensates for the various losses that are otherwise introduced by the connector; losses that are introduced by optical splices in the fiber optic lines; fiber optic medium attenuation losses; etc. As described below, inside the connector 34, the optical amplifier 90 is powered from the electrical lines that pass through the connector 34.

More specifically, in some embodiments of the invention, the connector 34 includes an inductive coupler 92 that, inside the connector 34, transfers power from one or more of the electrical lines of the cable segment 30 to the optical amplifier 90 for purposes of powering the optical amplifier 90. In some embodiments of the invention, one or more of the electrical lines may be electrical power lines that primarily are used to power devices (downhole tools or pumps, for example) of a well.

Thus, the connector 34 uses electrical power from adjacent electrical lines in the connector 34 for purposes of amplifying the incoming optical signals. As a more specific example, as depicted in FIG. 2, the electrical line 42b is connected to the inductive coupler 92 for purposes of transferring electrical power from the electrical line 42b to the optical amplifier 90.

Depending on the particular embodiment of the invention, the inductive coupler 92 may take on various forms. For example, in some embodiments of the invention, the inductive coupler 92 may include a ferromagnetic core 93 around which the electrical line 42b extends in a winding. The inductive coupler 92 includes another winding that is also wound around the core 93 and provides terminals 91 to the optical amplifier 90. Thus, due to the magnetic induction, power is transferred from the electrical line 42b to the optical amplifier 90.

FIG. 2 illustrates one out of many possible embodiments of the invention in which power from one or more adjacent power lines may be used to power an optical amplifier inside a connector without disrupting the continuity of the power line(s). Thus, for example, the power line(s) provide power to seabed and downhole monitoring and control devices located further along the cable independently from the operation of the amplifier 90 and regardless of whether or not the amplifier 90 fails.

Although not specifically depicted in FIG. 2, in some embodiments of the invention, the electrical line 42b may communicate an AC signal, and the optical amplifier 90 may include an AC-to-DC converter for purposes of converting the AC signal from the winding of the inductive coupler 92 into a DC signal to provide power to the optical amplifier 90. Furthermore, in some embodiments of the invention, this converter may provide multiple DC voltage supply levels to the electrical power-consuming components of the optical amplifier 90. Other variations are possible in other embodiments of the invention.

The optical amplifier 90 amplifies the optical signals that are present on the fiber optic lines 44a and 44b to produce boosted, or amplified, optical signals on fiber optic lines 46b and 46a, respectively. As shown in FIG. 2, the electrical lines 42a and 42b and the fiber optic lines 46a and 46b are routed to a connection interface 80 of the connector 34. In some embodiments of the invention, the connection interface 80 is a wet mate connection interface to couple the fiber optic and electrical lines (such as the lines 42a, 42b, 44a and 44b) of the cable segment 30 to the fiber optic and electrical lines (such as the lines 50a, 50b, 52a and 52b lines) of the cable segment 40 together. Depending on the particular embodiment of the invention, the connection interface 80 may provide a male or female connection or to the complimentary connection interface (now shown) of the connector 36.

Among the other features of the connector 34, in some embodiments of the invention, the connector 34 includes a sealed housing that is formed from a main housing section 70 and a stab plate 82. The housing section 70 includes a cavity that contains the optical amplifier 90 and the inductive coupler 92. As shown in FIG. 2, in some embodiments of the invention, electrical lines, such as the electrical lines 42a and 42b, may be routed into the housing section 70 via one or more conduits 72 that are formed in the housing section 70; and the fiber optic lines, such as the fiber optic lines 44a and 44b, may be routed into the housing section 70 via one or more conduits 74. Furthermore, one or more conduits 76 in the housing section 70 provide an opening for routing the electrical lines to the connection interface 80; and one or more conduits 78 in the housing section 70 provide access for routing the fiber optic lines 46a and 46b through the housing section 70 into the connection interface 80. It is noted that the connector 34 includes seals (not shown) for purposes of sealing the electrical and fiber optic communication lines to the housing section 70 and generally protecting the components that are contained in the housing section 70 from the surrounding environment.

Among the other features of the electrical connector 34, in some embodiments of the invention, the connector 34 may include a cable connector 94 for purposes of attaching the cable segment 30 to the housing section 70. Furthermore, in some embodiments of the invention, the stab plate 82 houses the connection interface 80. The connection interface 80 is exposed on the connection surface of the stab plate 82 (and thus, exposed outside of the housing of the connector 34) to receive the connection interface (not shown) of the connector 36.

Among the possible advantages of the invention, the above-described connector increases the range of fiber optic communications; allows for higher optical loss components within the communications link; allows passive splitters to be used for communication signal distribution; amplifies optical signals to improve receiver sensitivity; uses local power lines to provide power to optical amplifier without requiring an external power source; uses existing connector technology; requires no moving parts; uses relatively low power; and uses components, such as the inductive coupler and amplifiers that are relatively small and usually fitted within a connector housing. Other and different advantages are possible in other embodiments of the invention.

Figure 3:
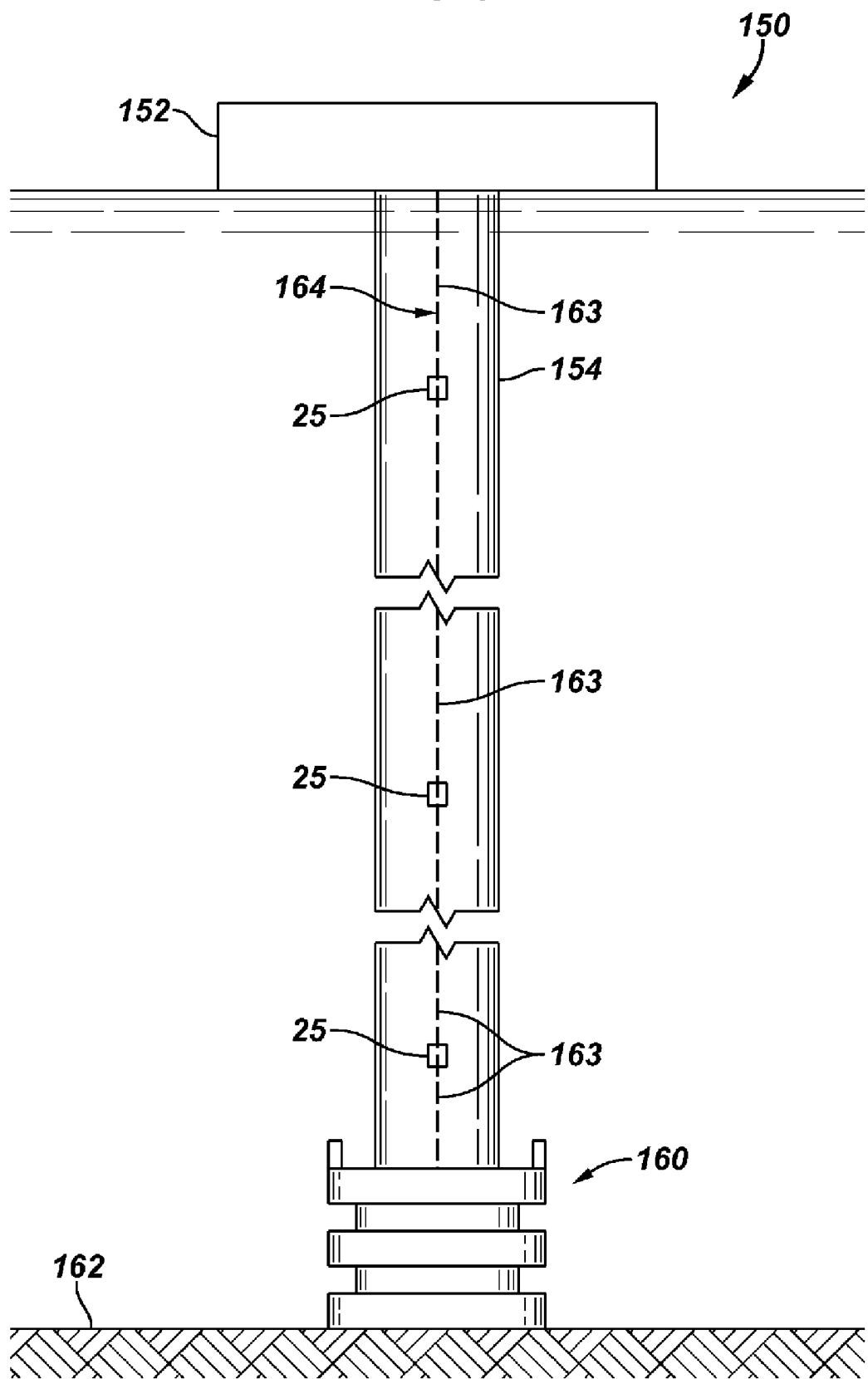
FIG. 3 is a schematic diagram of a subsea well according to an embodiment of the invention.

The booster connector 34 and the resultant connector assembly 25 may be used in a wide range of applications. For example, referring to FIG. 3, in some embodiments of the invention, one or more of the connector assemblies 25 (i.e., pairs of connectors 34 and 36) may be used to couple together cable segments 163 to form a cable 164 in a subsea field environment 150. Thus, as depicted in FIG. 3, in some embodiments of the invention, the cable 164 may extend through a marine riser 154 from a sea platform 152 to a subsea wellhead tree 160 that resides on the sea floor 162. Due to the increased signal range permitted by the amplification within the connector, such equipment as a subsea production tree control system may be controlled from the sea platform 152 using the cable 164 over a long range.

Figure 4:
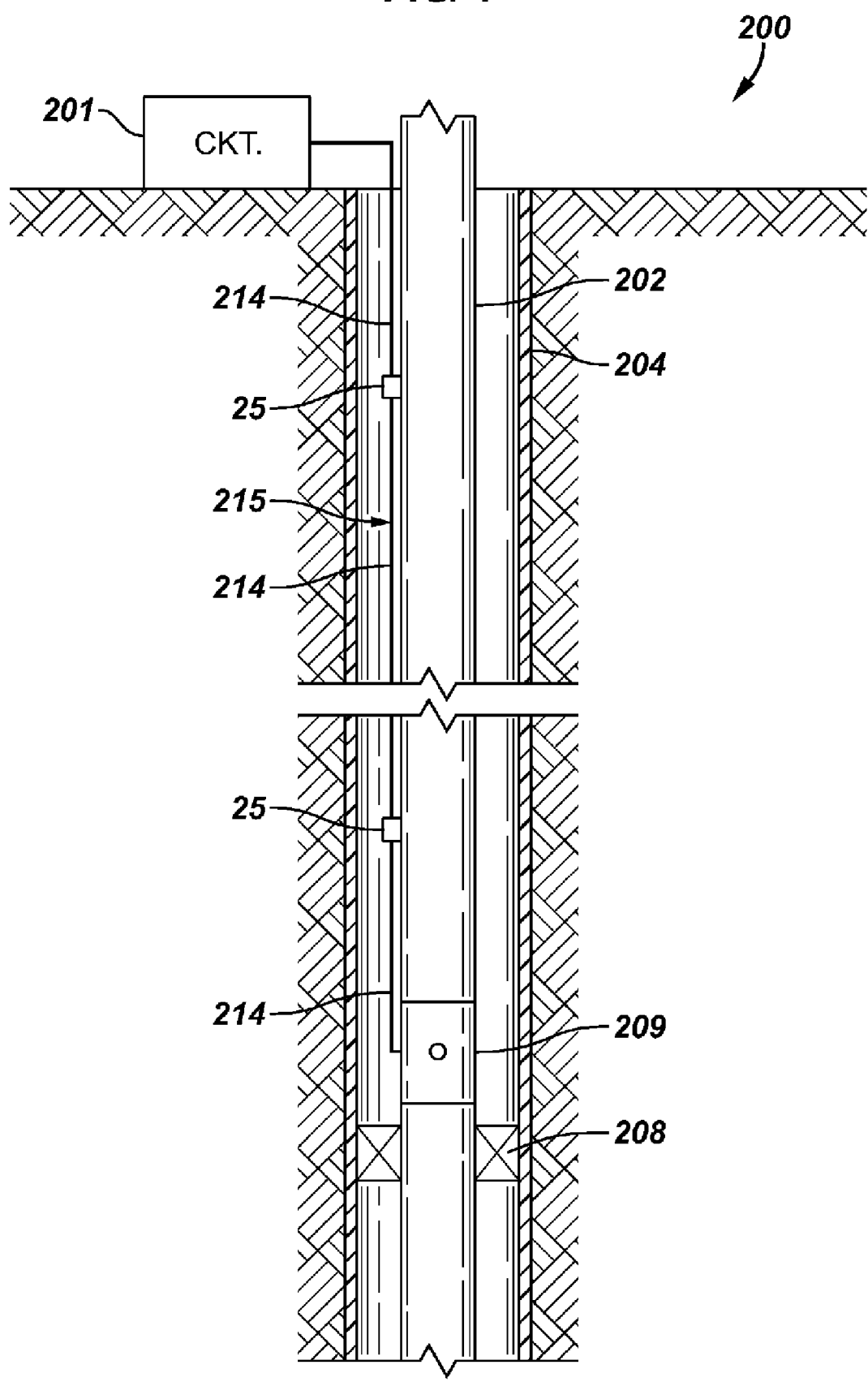
FIG. 4 is a schematic diagram of a subterranean well according to an embodiment of the invention.

Referring to FIG. 4, as another example, in a subterranean well environment 200, the connector assemblies 25 may be used to couple together cable segments 214 to form a cable 215 that extends from a surface circuit 201 downhole to permanent downhole intelligent completion equipment. For example, as depicted in FIG. 4, in some embodiments of the invention, a production tubing string 202 may extend downhole and may include various sensor and control valves, such as the control valve 209 that is depicted in FIG. 4. The control valve 209 may be located in, for example, a production zone that is established by at least one packer 208. The well may include additional cables 215 that include the connector assemblies 25 for purposes of controlling, and/or monitoring different downhole tools and equipment.

Figure 5:
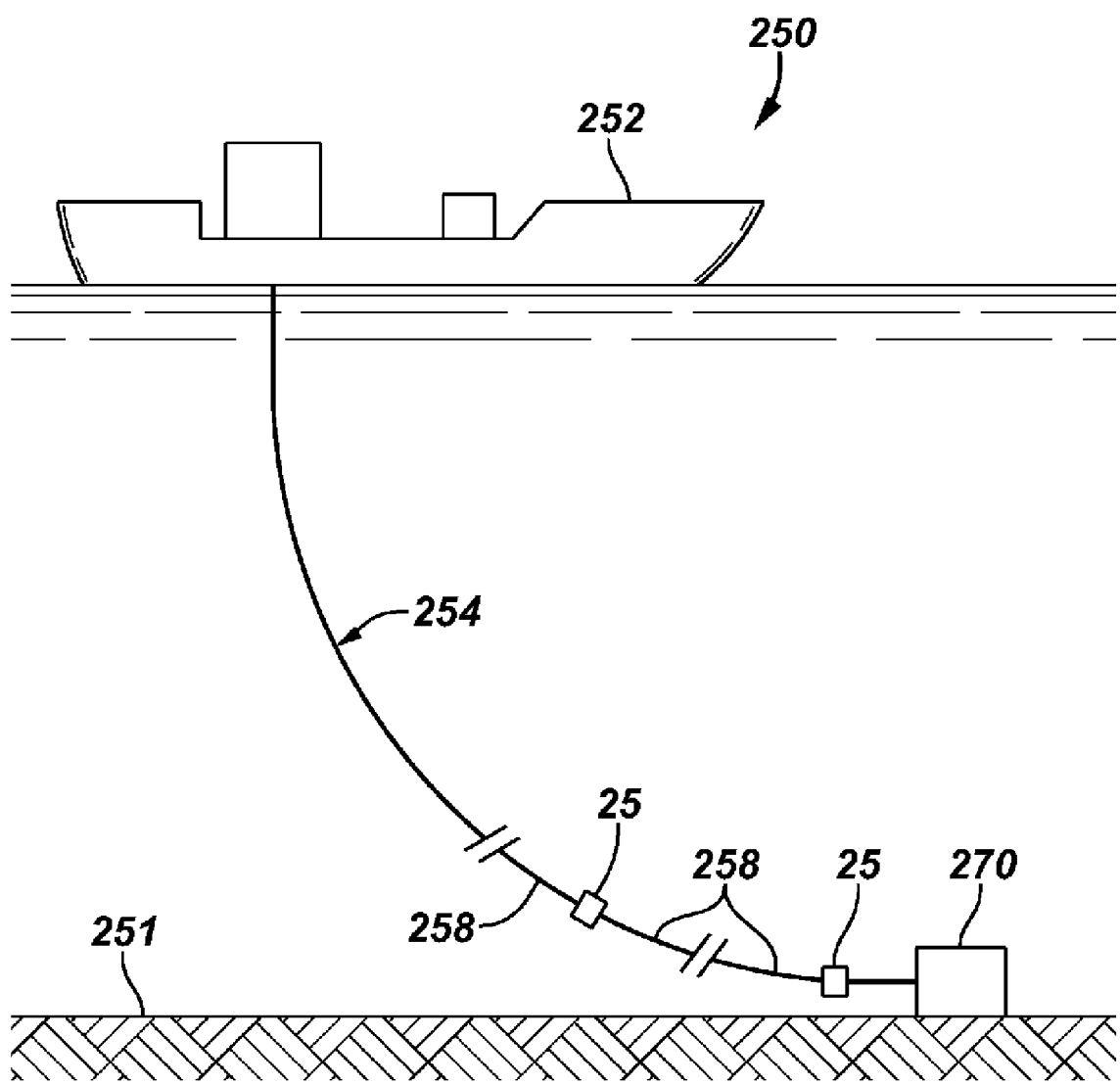
FIG. 5 is a schematic diagram of a subsea power/communications infrastructure according to an embodiment of the invention.

Referring to FIG. 5, as yet another example, the connector assemblies 25 may be used in a subsea communications/power infrastructure 250. More specifically, in the depicted infrastructure 250, the connector assemblies 25 may be used to couple together segments 258 of a communications/power umbilical 254 that extends from a surface vessel or platform 252 to a subsea wellhead 270 (part of a subsea well) that is located on the seabed 251. The umbilical 254 may have a relatively long length (a length greater than 50 kilometers (km), such as 100 km, as a more specific example) for purposes of routing power and/or establishing communication between the vessel/platform 252 and the wellhead 270 to control and/or monitor the associated subsea well. Because the connector assemblies 25 are contained within the umbilical 254, a defective connector 25 may be relatively easily disconnected and retrieved to the surface for repair if needed. This is to be contrasted to an arrangement in which an optical amplifier may be part of subsea distribution or manifold equipment, a scenario in which repair may not be possible. It is noted that the umbilical 254 may have more types of lines than just electrical and fiber optic lines. For example, in some embodiments of the invention, the umbilical 254 may include one or more hydraulic lines, chemical lines, etc., depending on the particular embodiment of the invention.

Figure 1:
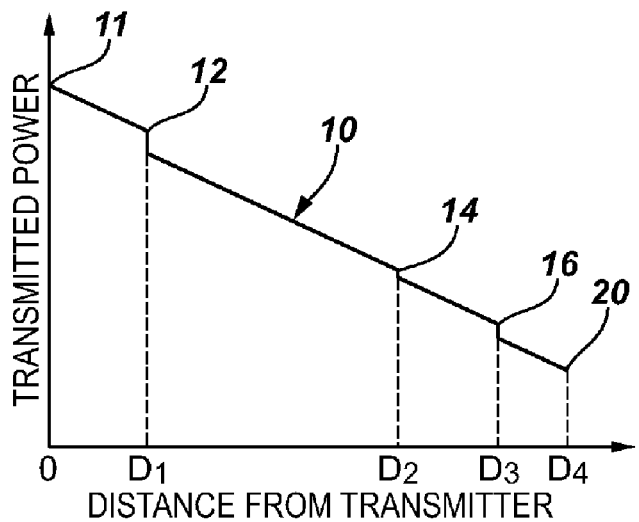
FIG. 1 is a waveform depicting optical power versus distance from an optical transmitter along a fiber optic line of the prior art.
Figure 6:
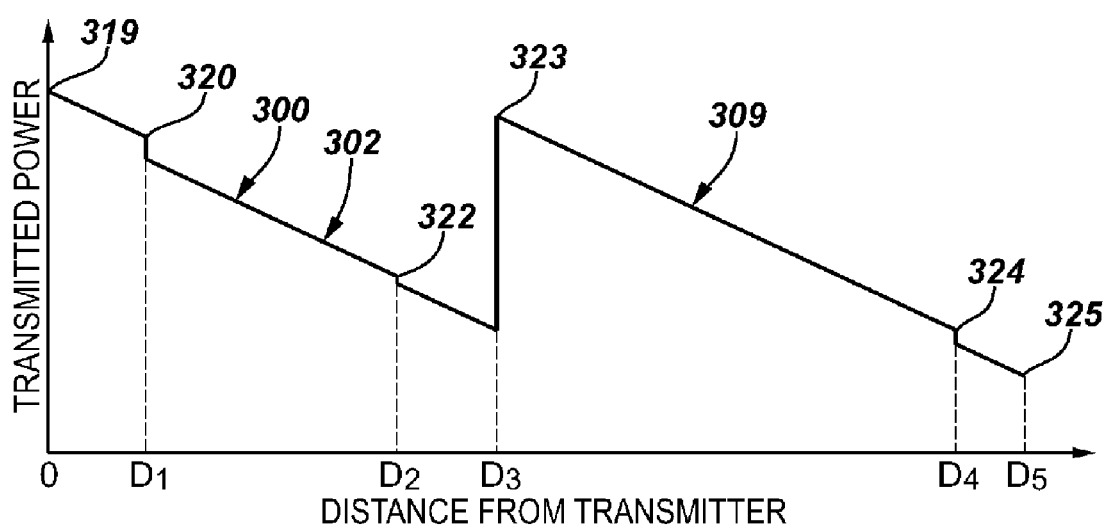
FIG. 6 is a waveform depicting optical power versus distance from a transmitter along a fiber optic line according to an embodiment of the invention.

FIG. 6 depicts the optical power 300 of an optical signal versus distance from an optical transmitter. More specifically, in this example, the optical signal propagates along a fiber optic line that is formed from two fiber optic line segments that are coupled together by a connector assembly 25 (FIG. 2) at a distance $D_3$ from the transmitter.

The optical power 300 includes a region 302 in which the optical power 300 generally declines from the transmitter to the connector assembly 25 at distance $D_3$. Thus, at reference numeral 319, the optical power 300 has its peak near the transmitter. More particularly, from the transmitter, fiber optic medium losses cause the optical power 300 to generally decline. At distance $D_1$ from the transmitter, a non-booster connector assembly introduces a relatively abrupt loss, as depicted at reference numeral 320. The optical power 300 continues to decline (due to fiber optic medium losses) from the $D_1$ distance until distance $D_2$, a distance at which a splice introduces another relatively abrupt loss, as depicted at reference numeral 322. From distance $D_2$ until distance $D_3$ the optical power continues to decline until the optical power 300 reaches its minimum at the connector assembly 25 at distance $D_3$.

The booster connector 34 (see FIG. 2) of the connector assembly 25 amplifies the optical power 300 to return the optical power 300 to its maximum value, as depicted at reference numeral 322. In a region 309 of the optical power 300, the optical power 300 generally declines from distance $D_3$ to distance $D_5$ of the fiber optic line. As shown, a splice at distance $D_4$ may introduce an additional loss, as depicted at reference numeral 324.

A receiver or another booster connector assembly 25 may be located at distance $D_5$, a distance at which the optical power 300 again reaches a minimum, as depicted at reference numeral 325. Thus, in a cable that is formed from a series of cable segments and connector assemblies 25, the optical power between connector assemblies 25 may follow the same general profile as the region 302 or 309.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. An apparatus, comprising:
   a housing to receive a fiber optic line and an electrical line;
   a first connection interface located at least partially inside the housing and exposed outside of the housing;
   a second connection interface located at least partially inside the housing and exposed outside of the housing to couple the fiber optic line and the electrical line to the first connection interface; and
   an optical amplifier located inside the housing and coupled to the fiber optic line, the optical amplifier to receive power from the electrical line.

2. The apparatus of claim 1, further comprising:
   a device to communicate power from the electrical line to the optical amplifier.

3. The apparatus of claim 2, wherein the device comprises an inductive coupler.

4. The apparatus of claim 2, wherein the device comprises a ferromagnetic core.

5. The apparatus of claim 1, wherein the fiber optic line and the electrical line are located in a cable.

6. The apparatus of claim 1, wherein the first connection interface is adapted to mate with the second connection interface to optically couple the fiber optic line to another fiber optic line and electrically couple the electrical line to another electrical line.

7. The apparatus of claim 6, wherein said another electrical line and said another fiber optic line are located in a cable that is connected to the second connection interface.

8. The apparatus of claim 1, wherein the fiber optic line communicates a signal to a device that is part of at least one of a well and a subsea infrastructure.

9. An apparatus, comprising:
   a first cable comprising a first fiber optic line and a second electrical line;
   a second cable comprising a second fiber optic line and a second electrical line;
   a first connector attached to the first cable; and
   a second connecter attached to the second cable to mate with the first connector to optically couple the first fiber optic line to the second fiber optic line and electrically couple the first electrical line to the second electrical line, the second connector comprising an optical amplifier adapted to boost a signal received from the second fiber optic line and receive power from the second electrical line.

10. The apparatus of claim 9, wherein second connector further comprises:
    a device to communicate power from the electrical line to the optical amplifier.

11. The apparatus of claim 10, wherein the device comprises an inductive coupler.

12. The apparatus of claim 10, wherein the device comprises a ferromagnetic core.

13. The apparatus of claim 9, wherein the first fiber optic line is coupled to an output terminal of the optical amplifier.

14. A system, comprising:
cables, each cable comprising fiber optic lines and electrical lines; and
at least one connector to connect the cables together,
wherein at least one of the connectors houses an optical amplifier powered by at least one of the electrical lines.

15. The system of claim 14, further comprising:
an inductive coupler to communicate power from said at least one of the electrical lines to the optical amplifier.

16. The system of claim 15, wherein the inductive coupler is located inside said at least one of the connectors.

17. The system of claim 14, wherein the cables establish communication between a tree of a subsea well and a surface platform.

18. The system of claim 14, wherein the cables establish communication with completion equipment.

19. A method, comprising:
running a fiber optic line and an electrical line in a well inside a cable; and
communicating power from the electrical line to an optical amplifier.

20. The method of claim 19, wherein the communicating comprises:
inductively coupling the electrical line to the optical amplifier.

21. The method of claim 20, wherein the inductive coupling comprises:
winding the electrical line around a magnetic core.

22. The method of claim 19, wherein the communicating comprises:
transferring the power between the electrical line to the optical amplifier inside a connector for the cable.

23. A method, comprising:
running a fiber optic line and an electrical line to a subsea structure inside a cable; and
communicating power from the electrical line to an optical amplifier.

24. The method of claim 23, wherein the communicating comprises:
inductively coupling the electrical line to the optical amplifier.

25. The method of claim 24, wherein the inductive coupling comprises:
winding the electrical line around a magnetic core.

26. The method of claim 23, wherein the communicating comprises:
transferring the power between the electrical line to the optical amplifier inside a connector for the cable.

27. An apparatus, comprising:
a first connector to form a releasable connection with a mating second connector to couple first and second fiber optic line segments together;
an optical amplifier located inside the first connector and optically coupled to the first and second fiber optic line segments when the first connector forms the connection with the second connector; and
an inductive coupler to communicate power from an electrical line segment to the optical amplifier,
wherein the fiber optic line segment and the electrical line segment are located in a cable shared in common.

28. The apparatus of claim 27, wherein the first connector couples the electrical line segment to another electrical line segment when the first connector forms the connection with the second connector.

* * * * *